UNITED STATES PATENT OFFICE.

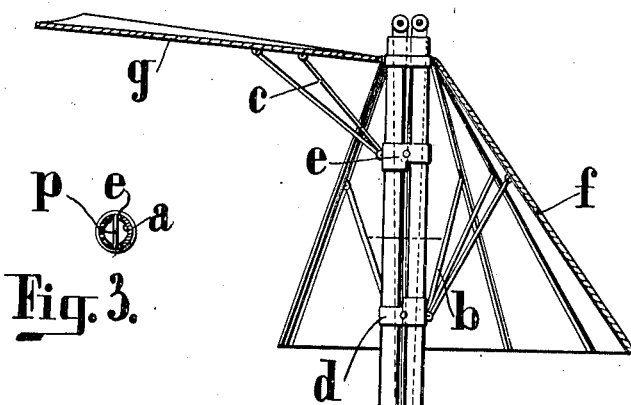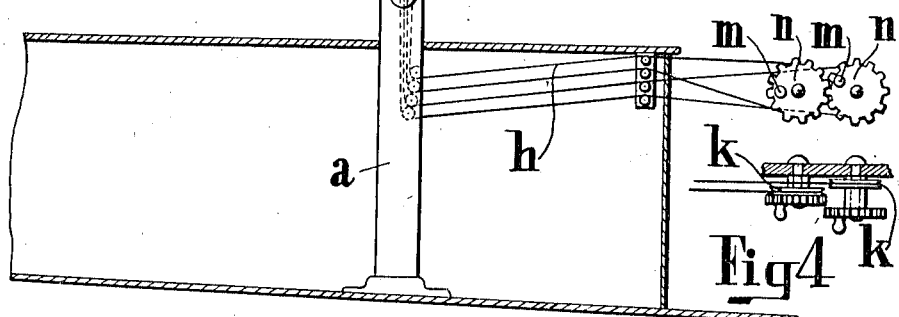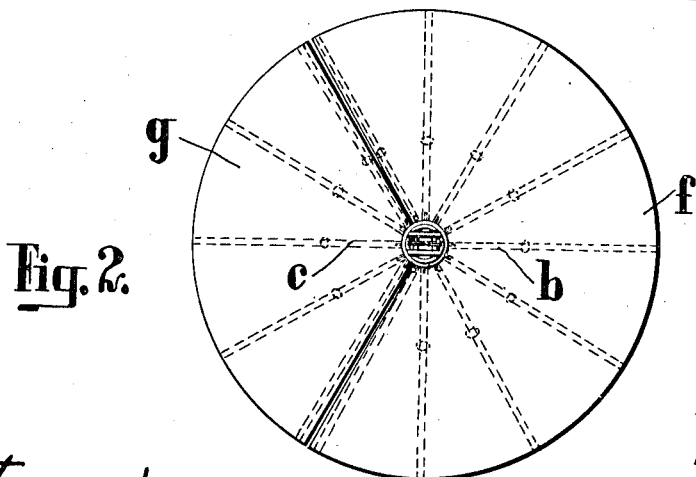

ALEXANDER HORTON, OF PORTSMOUTH, ENGLAND.

DEVICE FOR USE ON AERIAL AND OTHER VESSELS.

1,019,647.  Specification of Letters Patent.  Patented Mar. 5, 1912.

Application filed August 4, 1911. Serial No. 642,394.

*To all whom it may concern:*

Be it known that I, ALEXANDER HORTON, a subject of the King of England, residing at 38 Marmion road, Portsmouth, Hampshire, England, have invented certain new and useful Improvements in Devices for Use on Aerial and other Vessels, of which the following is a specification.

This invention relates to a device for attachment to aerial vessels and is designed for preventing too rapid descents through the air in the event of some accident to the supporting planes or other sustaining parts, which device may also be used to act as an additional elevator if desired.

The device which somewhat resembles a parachute and which is fitted at any suitable part of the vessel preferably toward the bow, consists generally of a pole provided with a species of umbrella having ribs attached to two different collars, which slide upon the said pole, in such a way that when one of the collars, that is the lower collar, is slid upward it moves both collars and raises all the ribs, taking with them the material of the device which then acts as a parachute or support, while when the top collar alone is moved one portion only of the ribs and material is raised and the device acts as an elevator. And in order that my said invention may be better understood, I will now proceed to describe the same with reference to the drawing accompanying this specification in which:—

Figure 1 shows a sectional side elevation of the device fixed upon the body of an airship; Fig. 2 is a plan of a portion of Fig. 1; Figs. 3 and 4 show details hereinafter referred to.

The same letters of reference are employed to denote the same parts in all the views.

$a$ is a pole. This is fitted at any suitable part of the vessel preferably toward the bow. This pole is provided with a device somewhat resembling an umbrella comprising a number of ribs $b$ and $c$ attached to different collars $d$ and $e$ sliding upon the pole $a$. When the collar $d$ is slid upward it takes with it the other collar $e$ and consequently all the ribs $b$ and $c$ are raised. This has the effect of opening out the material, which is formed in two portions $g$ and $f$. If on the other hand the upper collar $e$ is alone raised, the ribs $c$ elevate the portion $g$ of the material. The device now assumes the position shown at Fig. 1 and the effect is that the device in place of acting as a parachute acts as a plane or elevator.

In the normal position when not in use the material is gathered around the pole and presents practically no resistance to the motion of the vessel. The device may be controlled by suitable cords $h$ passing over pulleys $k$ and operated by handles $m$ under the control of the pilot.

Each of the pulleys may be operated singly by rotating its handle $m$ or they may both be operated by one of the handles $m$ by means of the toothed wheels $n$ being brought into engagement. To effect this one of the spindles is squared and the corresponding wheel $n$ is made to slide thereon so that this wheel $n$ may be put into or taken out of gear with the other wheel $n$. This mechanism is shown at Figs. 1 and 4.

Fig. 3 shows section of a pole $a$ and one of the collars in order to illustrate the construction. In this figure a pin $p$ is shown passing through slots in the pole and to this pin are attached the actuating cords $h$.

It will be understood that I may modify the construction of the device as to minor details without departing from the principle of the invention.

What I claim as my invention and desire to secure by Letters Patent of the United States of America is:—

1. In an aerial vessel, the combination of a plurality of pivotally supported planes, a plurality of slidably mounted collars, ribs pivotally connecting each of the planes to one of the collars, and means for actuating one or both of said collars, substantially as described.

2. In an aerial vessel, the combination of a pole, a plurality of planes pivotally connected to the pole, a plurality of collars slidably mounted on the pole, ribs pivotally connecting each of the planes to one of the collars, and means for actuating said collars, substantially as described.

3. In an aerial vessel, the combination of a vertical pole, a plurality of planes pivotally connected to the pole, the pole being provided with a longitudinal slot, a plurality of collars slidably mounted on the pole, a pin fixed in each collar and sliding in said slot, ribs pivotally connecting each of the planes to one of the collars, and means for actuating said collars, substantially as described.

4. In an aerial vessel, the combination of a vertical pole, a plurality of planes pivotally connected to the pole, the pole being provided with a longitudinal slot, a plurality of collars slidably mounted on the pole, a pin fixed in each collar and sliding in said slot, ribs pivotally connecting each of the planes to one of the collars, a system of ropes and pulleys for actuating each collar, and means for coupling said systems whereby both collars will be operated at the same time, substantially as described.

In testimony whereof, I affix my signature, in presence of two witnesses.

ALEXANDER HORTON.

Witnesses:
A. E. VIDAL,
L. SIMMADS.